United States Patent [19]

Stechmann

[11] 3,805,132

[45] Apr. 16, 1974

[54] ELECTRONIC CIRCUIT FOR STABILIZING THE SWING AMPLITUDE OF A MECHANICAL VIBRATING SYSTEM

[75] Inventor: Helmut Stechmann, Schwenningen, Germany

[73] Assignee: Kienzle Uhrenfabriken GmbH, Schwenningen am Neckar, Germany

[22] Filed: Dec. 22, 1971

[21] Appl. No.: 210,965

[30] Foreign Application Priority Data

Dec. 28, 1970 Germany .................. P 20 63 956.9

[52] U.S. Cl. .............. 318/130, 58/23 A, 58/23 AC, 318/132, 331/109, 331/116 M

[51] Int. Cl. .............................................. H02k 33/14

[58] Field of Search .................... 318/114, 119, 122, 318/126, 127, 128, 129, 130, 132, 133, 138; 58/23 AP, 23 A, 23 BA, 23 AC; 331/75, 109, 116 R, 116 M

[56] References Cited

UNITED STATES PATENTS

| | | | |
|---|---|---|---|
| 3,509,437 | 4/1970 | Hashimura | 318/129 |
| 3,671,829 | 6/1972 | Mathews | 318/128 |
| 3,541,777 | 11/1970 | Ganter | 331/116 M |

*Primary Examiner*—J. D. Miller
*Assistant Examiner*—H. Huberfeld
*Attorney*—William D. Hall et al.

[57] ABSTRACT

A circuit for stabilizing the swing amplitude of a mechanical vibrating system comprises an output coil and a control coil coupled respectively to output and regulating transistors, across a source of supply potential. A resistor is connected in series with the emitter-collector circuit of the regulating transistor across the source of supply potential to form a voltage divider to which the base of the output transistor is connected. A capacitor is connected in series with the control coil, and the series connected control coil and capacitor are in turn connected in parallel with said resistor. A further capacitor connects the base of the regulating transistor to the base of the output transistor, or to the junction between the control coil and first-mentioned capacitor, when said transistors are of like conductivity types. When the transistors are of unlike conductivity types, the further capacitor couples the base of the regulating transistor to the positive side of the supply source.

5 Claims, 3 Drawing Figures

PATENTED APR 16 1974 3,805,132

ELECTRONIC CIRCUIT FOR STABILIZING THE SWING AMPLITUDE OF A MECHANICAL VIBRATING SYSTEM

BACKGROUND OF THE INVENTION

The present invention is concerned with an improved electronic circuit for stabilizing the swing amplitude of a mechanical vibrating system. Such circuits are generally known, and comprise an output coil and a control coil inductively coupled to one another. An output transistor is connected to the output coil, with the base of the output transistor in turn being connected to a voltage divider comprising a resistance and the emitter collector circuit of a regulating transistor. The base of the regulating transistor is in turn normally connected to the control coil in such manner that the regulating transistor is driven into at least partial conduction simultaneous with the output transistor upon occurrence of an inductive voltage of predetermined polarity.

Circuits of the type described above tend to assure that the regulating signal produced by the regulating transistor occurs at the same time, and without any lag, relative to the control signal for the output transistor, i.e., in other words, there is no phase shift relative to the two signals. It has been found that the regulating ability of such circuits is quite good. The known circuits do have a significant problem however, in that it is ordinarily not possible to arrange the output and control coils together on the same side of the output transistor since, when this is attempted in known circuits of the general types discussed above, the resistance of the output coil tends to adversely influence the controlling ability of the circuit. This influence is substantial since the range of output coil resistance is relatively wide.

The present invention is intended to obviate this problem.

SUMMARY OF THE INVENTION

In accordance with the present invention, an electronic circuit for stabilizing the swing amplitude of a mechanical vibrating system may take the general form already described, and known in the art. The problem of prior circuits, already discussed, is solved by connecting a capacitor in series with the control coil, and by in turn connecting this series-connected circuit in parallel with the resistance forming a portion of the aforementioned voltage divider. Moreover, when the output and regulating transistors are of like conductivity type, the base of the regulating transistor is coupled via an additional capacitor to the base of the output transistor, or to the junction between the control coil and first-mentioned capacitor. When the output regulating transistors are of unlike conductivity type, the further capacitor couples the base of the regulating transistor to the positive side of the supply source.

DESCRIPTION OF THE PREFERRED EMBODIMENTS

Figure 1:
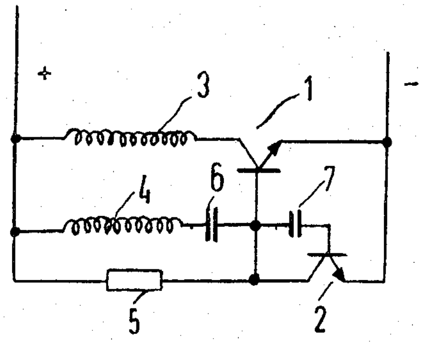
FIG. 1 illustrates a first embodiment of the invention wherein the base of the regulating transistor is connected via a capacitor directly to the base of the output transistor.
Figure 2:
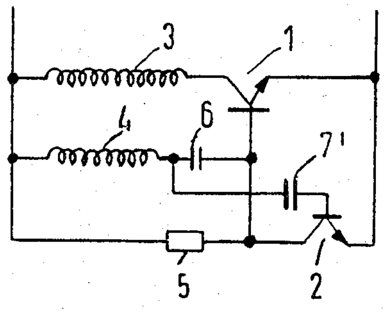
FIG. 2 shows a modification of the circuit wherein a condenser is placed between one terminal of the control coil and the base of the regulating transistor.

FIGS. 1 and 2 show circuits, of the types described above, employing an output transistor 1 and a regulating transistor 2 of identical conductivity types. The output coil 3 has one of its ends connected to the positive side of the supply source, and its other end is connected via the emitter-collector circuit of the output transistor 1 to the negative side of said source. A resistor or resistance means 5 is connected in series with the emitter-collector circuit of the regulating transistor 2, across the aforementioned supply source; and the base of output transistor 1 is connected to the center of said voltage divider.

The control coil 4 is coupled to the base-collector circuit of the output transistor 1 via a capacitor 6. By this configuration, therefore, it will be appreciated that the coils 3 and 4 are each connected on the same side of the output transistor 1. In the embodiment shown in FIG. 1, the base of the regulating transistor 2 is connected, via a capacitor 7, to the base of the output transistor 1. In the modified circuit, shown in FIG. 2, the base of the regulating transistor 2 is connected via a capacitor 7′ to the end of control coil 4 remote from the positive supply terminal, i.e., to the junction between control coil 4 and capacitor 6. In either case, however, the base of the output transistor 1 and the base of the regulating transistor 2 are influenced by the same side of the control coil 4.

The resistance of the emitter-collector path of transistor 2, forming a portion of the voltage divider 2, 5 is determined by the induced voltage in coil 4. The induced voltage in coil 4 simultaneously drives output transistor 1 into conduction. When the mechanical oscillator exhibits a comparatively high amplitude, a correspondingly high voltage will be induced in coil 4. When this occurs, the comparatively high induced voltage in coil 4 drives regulating transistor 2 into relatively heavy conduction so that, as a result, the inductive voltage in coil 4 can drive output transistor 1 only into partial conduction. In this condition of operation, therefore, only a comparatively small current can flow through the coil 3. When the conditions of operation change, e.g., if the amplitude of the oscillating system falls below a desired value, the voltage induced in coil 4 is similarly reduced in magnitude and becomes comparatively small. Such a small voltage is unable to render transistor 2 conductive, or renders it only partially conductive; and, as a result, the operating point of transistor 1 is altered so that the induced voltage in coil 4 can drive transistor 1 into comparatively heavy conduction. When the amplitude of the oscillating system is relatively low, therefore, the current flowing through coil 3 increases above the level of current which would flow through said coil if the amplitude of the mechanical oscillating system were comparatively high.

Figure 3:
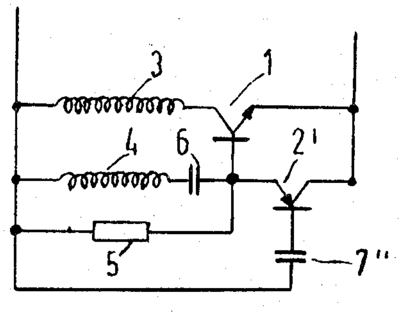
FIG. 3 shows a further modification of the circuit employing transistors of unlike conductivity types.

FIG. 3 shows an alternative embodiment of the invention wherein the output and regulating transistors are of different conductivity types. The arrangement is generally similar to those described above in reference to FIGS. 1 and 2; but in the FIG. 3 embodiment, the base of the regulating transistor 2′ is connected through a capacitor 7′′ to the positive side of the supply source. As a result, the control coil 4 together with the capacitor 6 are located in the base-emitter circuit of the regulating transistor 2'.

Having thus described my invention, I claim:

1. An electronic circuit for stabilizing the swing amplitude of a mechanical vibrating system comprising an output coil and a control coil inductively coupled to one another, means connecting corresponding first ends of said output coil and control coil to one another, an output transistor having its emitter-collector circuit connected in series with the other end of said output coil across a source of supply potential, a regulating transistor, resistance means connected directly in series with the emitter-collector circuit of said regulating transistor across said source of supply potential to form a voltage divider across said source, means connecting the base of said output transistor to said voltage divider, first capacitor means connected in series with said control coil between the other end of said control coil and said output transistor, said series-connected control coil and first capacitor means being connected in parallel across said resistance means, and second capacitor means coupling the base of said regulating transistor to a point on said control coil operative to cause an inductive voltage of predetermined polarity to drive said regulating transistor at least partially into conduction simultaneous with conduction of said output transistor.

2. The electronic circuit of claim 1 wherein said output and regulating transistors are of like conductivity types, said second capacitor means coupling the base of said regulating transistor to the junction between said first capacitor means and the base of said output transistor.

3. The electronic circuit of claim 1 wherein said output and regulating transistors are of like conductivity types, said second capacitor means coupling the base of said regulating transistor to the junction between the control coil and said first capacitor means.

4. The electronic circuit of claim 1 wherein said output and regulating transistors are of unlike conductivity types, said second capacitor means coupling the base of said regulating transistor to the end of said control coil remote from the junction between said control coil and said first capacitor means.

5. The electronic circuit of claim 1 wherein said corresponding first ends of said output and control coils are connected to the positive side of said source of supply potential, the said other ends of said coils being coupled respectively to the collector and base of said output transistor, the emitter of said output transistor being connected to the negative side of said source of supply potential, said second capacitor means coupling the base of said regulating transistor to the positive side of said source of supply potential.

* * * * *